Nov. 29, 1966   J. E. SHINN   3,288,488
COMBINED HUBCAP AND STEP TREAD CONSTRUCTION
Filed April 30, 1965

Jack E. Shinn
INVENTOR.

BY Clarence A. O'Brien
and Harvey B. Jacobson
Attorneys

United States Patent Office 3,288,488
Patented Nov. 29, 1966

3,288,488
COMBINED HUBCAP AND STEP TREAD
CONSTRUCTION
Jack E. Shinn, 226 Feldt, Evansdale, Iowa
Filed Apr. 30, 1965, Ser. No. 452,071
6 Claims. (Cl. 280—165)

This invention relates to an improved device for mounting and dismounting motor vehicles and more specifically to a combination step and hubcap member for use with large truck tractors especially cab-over-engine types.

A long recognized safety hazard in the trucking business has been the practice of drivers, in mounting and dismounting the truck tractor, to use the front hubcap as a step. Due to the design of most large truck tractors, especially the awkward placement of existing mounting stirrups, it is very difficult, if not impossible to mount and dismount without stepping on the hubcap.

Accordingly, it is a primary object of this invention to provide a combination hubcap and step member which provides both an attractive appearance when in place on the truck and a safe tread step for mounting and dismounting the truck.

Another object of the present invention is to provide an auxiliary front hubcup adapted to be placed over existing truck hubcaps which is of one-piece construction and can be easily and inexpensively manufactured out of readily available material.

A further object of the present invention is to provide a hubcap member which has a safety step tread thereon which can be used as a step when the truck wheel on which it is mounted is in any rotational position.

It is another object of the present invention to provide a combination hubcap and step member which does not require special detachment when changing the truck tire and which does not adversely affect the balance of truck wheels when in place thereon.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2:
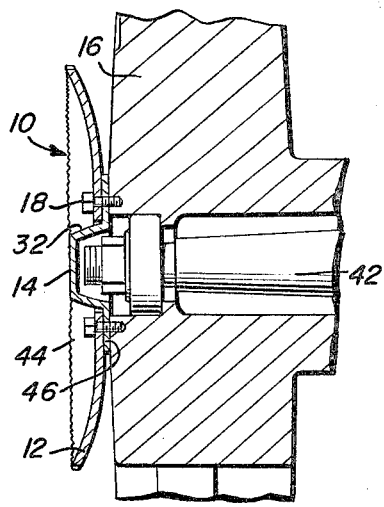
FIGURE 2 is an enlarged cross-sectional view taken substantially along the plane of the line 2—2 of FIGURE 1.
Figure 3:
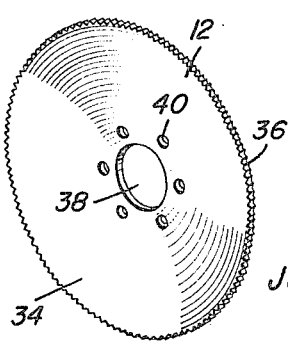
FIGURE 3 is a perspective view of the combination hubcap and step device comprising the present invention.

Referring now to the drawings and particularly to FIGURE 2, reference numeral 10 refers generally to the hubcap step device comprising the present invention. The hubcap step device comprises an attaching plate 12 which, as shown in FIGURE 2, is adapted to be mounted over the hubcap member 14 which is a conventional hubcap used on the wheels of large truck tractors. The hubcap 14 is attached to the truck wheel 16 by bolts 18 in a manner well known to those skilled in the art.

Figure 1:
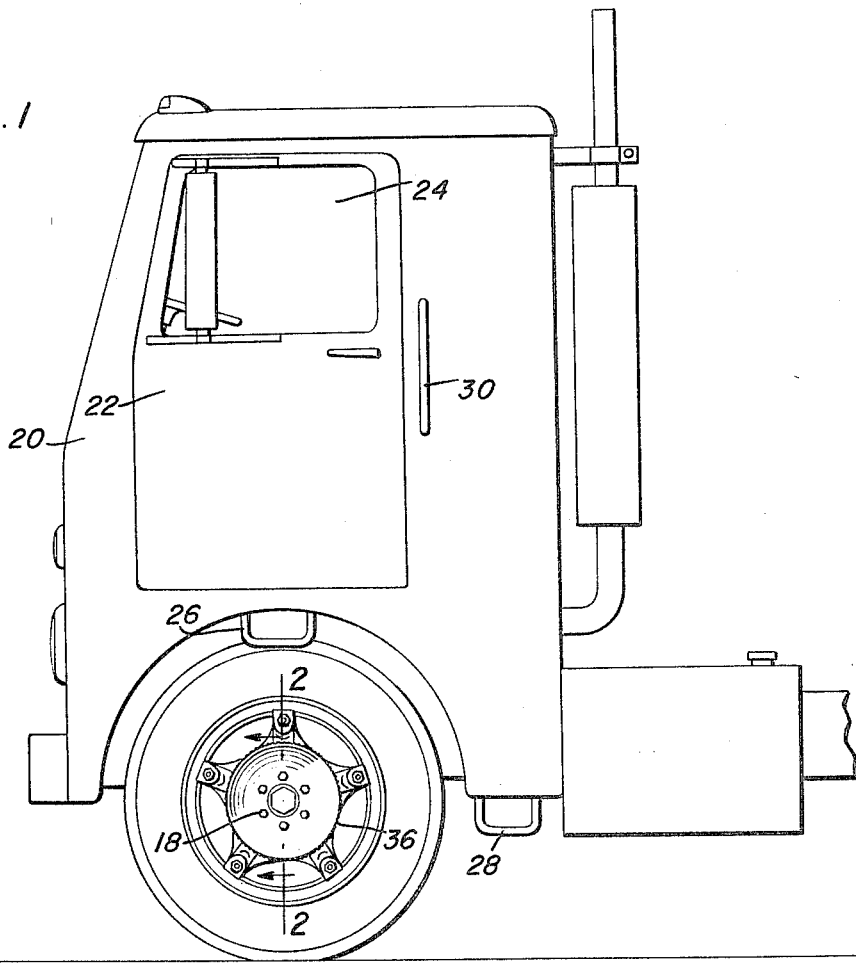
FIGURE 1 is a side elevational view of the hubcap and step device comprising the present invention in place on a truck tractor.

Referring now to FIGURE 1, reference numeral 20 refers to the truck tractor of conventional design, which normally includes a door 22 providing for entry to the driving compartment 24. Due to the height of the door 22 above the ground, it is necessary to provide mounting stirrups 26 and 28 to provide a means to mount the truck. Also a handrail 30 is provided to give the driver an additional means for support when so mounting the truck. The intended way to enter the compartment 24 is to open the door 22, put your right foot in stirrup 28, put your left foot in stirrup 26, grasp the handrail 30 with your right hand having opened the door with your left hand and then mount the truck. It may be appreciated that the placement of the stirrup 28 in relation to stirrup 26 and handrail 30 makes it very difficult to enter the compartment 24. Thus the normal manner in which most truck drivers enter their trucks is by stepping on the upper surface 32 of the hubcap 14 and using the stirrup 26 and the handrail 30 to climb into the compartment 24. It is obvious that the use of the hubcap 14 is dangerous due to the small, slanted and relatively smooth supporting surface offered by the upper surface 32 of the hubcap 14, thereby leading to many accidents during both mounting and dismounting trucks.

The use of the present invention in order to eliminate the safety hazard of slipping off the upper surface 32 of the hubcap 14 is explained as follows. The plate 12 comprises a concave annular disk 34 having a serrated peripheral edge 36, and a center opening 38. The concave disk 34 is mounted over the hubcap 14 by removing the bolts 18 which support the hubcap 14 on the wheel 16, slipping the disk 34 over the hubcap 14 and replacing the bolts 18 through the holes 40 which are spaced about the opening 38 in alignment with the mounting bolts 18 into the mounting holes of the hubcap 14. Thus it may be seen that the concave disk 34 is fixed to the wheel 16 over the hubcap 14, thereby giving the wheel an attractive appearance and by virtue of its serrated peripheral edge 36, providing a safe tread station for the truck driver to step on in either mounting or dismounting the truck.

It may be appreciated that the persent invention is especially convenient in use as the concave disk 34 does not have to be specially removed from the wheel in order to remove the wheel 16 from the truck axle 42, but may merely be removed during the removal of the hub cap 14, i.e., by removal of the bolts 18. Further the use of the concave disk 34 eliminates the necessity of having a stirrup in the place of stirrup 28.

When mounted over the hubcap 14, the concave disk 34 has its concave face 44 opening outwardly of the vehicle 20, thereby allowing a flush mounting of the concave disk 34 against the peripheral area 46 of the hub cap member 14. Due to this mounting, the serrated peripheral portion 36 of the concave disk 34 is spaced away from the wheel 16 thereby leaving room for the driver to use the peripheral portion 36 as a mounting and dismounting step. Further, it may be appreciated that the serrated portion 36 may be used as a step in mounting and dismounting the truck regardless of the rotational position of the wheel 16, as the serrated portion 36 extends completely about the periphery of the concave disk 34.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a motor vehicle wheel including a center hub portion, a step member comprising an attaching plate having a centrally disposed mounting portion, said plate attached to said wheel at said mounting portion and being concave outwardly from said central mounting portion and away from said wheel whereby said plate is operative as a mounting and dismounting step as well as providing an attractive appearance on said wheel, said wheel including a hubcap mounted thereon at said center hub portion by threaded connector means extending through said hubcap and removably connected to said wheel, said plate comprising an annular disk defining a central opening receiving said hubcap therethrough, said disk including mounting holes spaced about said central opening receiving said connector means therethrough whereby said disk is connected to said wheel over said hubcap by said connector means, said disk including a serrated peripheral portion, said peripheral portion being spaced substantially away from said wheel due to the outwardly concave configuration of said disk, said peripheral portion being operative as a mounting step when said wheel is in any rotational position.

2. In combination with a vehicle wheel of the type including a central hub portion defining inner and outer sides, a step member, said step member being generally circular and dish-shaped in configuration with its central and outermost peripheral portions disposed in spaced apart generally parallel planes, said central portion of said dish-shaped member being secured to the outer side of said central hub portion in general concentric relation thereto, the plane in which said outer peripheral portions of said step member are disposed being spaced outwardly of said outer side of said hub portion, said outer peripheral portions of said step member being spaced axially outwardly of corresponding portions of said wheel and including a fully exposed and roughened peripheral edge.

3. The combination of claim 2 wherein said central portion of said dish-shaped member defines a centrally located opening extending through said central portion receiving therethrough a hubcap secured to and projecting outwardly of said outer side of said central hub portion.

4. The combination of claim 2 wherein said step member is concavo-convex in shape.

5. The combination of claim 2 wherein said central portion of said dish-shaped member defines a centrally located opening extending through said central portion receiving therethrough a hubcap secured to and projecting outwardly of said outer side of said central hub portion, said central portion of said dish-shaped step member including a plurality of apertures spaced about said opening and said step member being secured to said central hub portion by means of fasteners passed through said apertures and secured in said hub portion.

6. The combination of claim 3 wherein said peripheral edge is serrated.

References Cited by the Examiner

UNITED STATES PATENTS

| | | | |
|---|---|---|---|
| 579,133 | 3/1897 | Cole | 280—165 |
| 1,214,882 | 2/1917 | Bessant | 172—555 |
| 1,474,632 | 11/1923 | House. | |
| 1,906,307 | 5/1933 | Booth | 301—108 X |
| 2,218,060 | 10/1940 | Watson | 280—165 |
| 2,344,306 | 3/1944 | Hyman | 280—165 |

MILTON BUCHLER, *Primary Examiner.*

RICHARD J. JOHNSON, *Examiner.*